(12) United States Patent
Takemura et al.

(10) Patent No.: US 7,757,154 B2
(45) Date of Patent: Jul. 13, 2010

(54) MAGNETIC DISK CONTROL APPARATUS, MAGNETIC DISK APPARATUS, AND METHOD OF CORRECTING READ ERROR

(75) Inventors: Noriaki Takemura, Higashine (JP); Ichiro Hara, Higashine (JP); Masayuki Mito, Higashine (JP)

(73) Assignee: Toshiba Storage Device Corporation, Tokyo (JP)

( * ) Notice: Subject to any disclaimer, the term of this patent is extended or adjusted under 35 U.S.C. 154(b) by 850 days.

(21) Appl. No.: 11/604,450

(22) Filed: Nov. 27, 2006

(65) Prior Publication Data

US 2008/0005645 A1 Jan. 3, 2008

(30) Foreign Application Priority Data

Jun. 30, 2006 (JP) ............................. 2006-182252

(51) Int. Cl.
*G11C 29/00* (2006.01)

(52) U.S. Cl. ....................................................... 714/769

(58) Field of Classification Search .................. 714/42, 714/746, 763, 769; 360/53, 75
See application file for complete search history.

(56) References Cited

U.S. PATENT DOCUMENTS

| 4,216,541 | A | * | 8/1980 | Clover et al. ................ 714/764 |
| 5,189,566 | A | * | 2/1993 | Christensen et al. .......... 360/53 |
| 7,023,645 | B1 | * | 4/2006 | Emo et al. .................... 360/75 |
| 7,415,636 | B2 | * | 8/2008 | Takahashi .................... 714/42 |
| 7,606,129 | B2 | | 10/2009 | Urata et al. .................... 369/53 |

FOREIGN PATENT DOCUMENTS

| JP | 2001-04606 | 1/2001 |
| JP | 2006-139581 | 6/2006 |

* cited by examiner

*Primary Examiner*—Shelly A Chase
(74) *Attorney, Agent, or Firm*—Greer, Burns & Crain, Ltd.

(57) ABSTRACT

A magnetic disk control apparatus includes an error determining unit and a correcting unit. When a correctable read error has occurred during read access to a disk drive, the error determining unit specifies an area on the disk drive where an error may occur due to the same cause as that of the correctable read error. The correcting unit corrects the area specified by the error determining unit by rewriting the area.

19 Claims, 10 Drawing Sheets

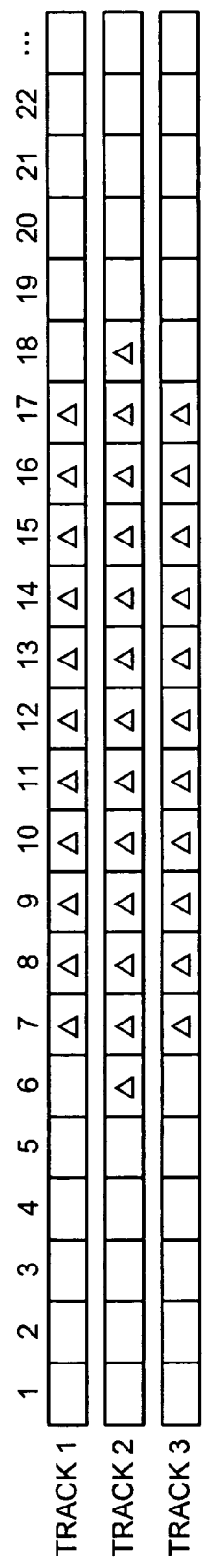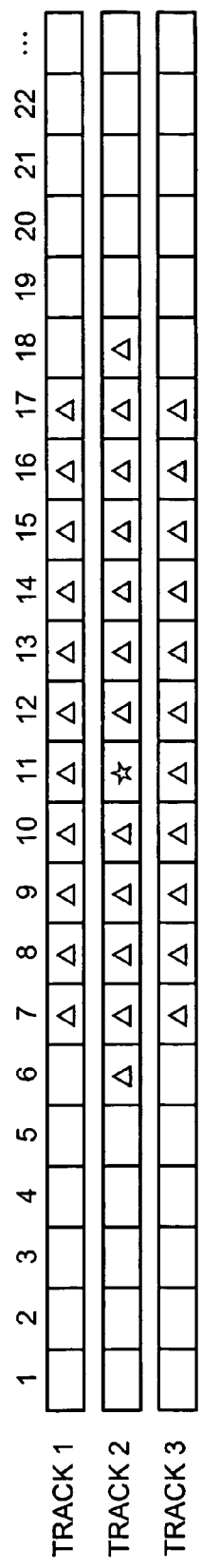

| PLATTER NUMBER | TRACK NUMBER | SECTOR NUMBER | ERROR TYPE | DATE AND TIME |
|---|---|---|---|---|
| | | | | |
| | | | | |
| | | | | |

MAGNETIC DISK CONTROL APPARATUS, MAGNETIC DISK APPARATUS, AND METHOD OF CORRECTING READ ERROR

BACKGROUND OF THE INVENTION

1. Field of the Invention

The present invention relates to a technology for correcting errors and preventing data loss.

2. Description of the Related Art

In a magnetic disk apparatus, the magnetization direction of its magnetic material changes due to aging, and, in due course, data stored therein may not be read correctly. Japanese Patent Application Laid-open No. 2006-139581, for example, discloses a technology for returning the magnetization direction of the magnetic material to its original direction by overwriting data read from a sector to the same sector when a correctable read error occurs in this sector. The process of overwriting data read from a sector to the same sector to correct an error that may results in a fatal error is referred to as rewriting.

In recent years, with the progress in multimedia, a larger storage capacity is required in a magnetic disk apparatus as a medium for storing images and music. Accordingly, storage density of the magnetic disk apparatus is substantially increased, which makes problems not notable in the past cause a serious error.

For example, little space between tracks, which has been reduced to increase the storage density, causes side erase when data is written to a certain sector. In the side erase, a magnetic flux leakage of a magnetic head affects a sector of adjacent tracks. Repeated side erase is likely to lead to errors in a wide range.

However, according to the conventional technology, data is rewritten to only a sector in which a correctable read error has occurred. When there are errors in a wide range as described above, all the errors are not corrected. Accordingly, after a part of sectors is rewritten, a fatal error sometimes occurs in surrounding sectors, and data in these sectors cannot be read.

SUMMARY OF THE INVENTION

It is an object of the present invention to at least partially solve the problems in the conventional technology.

According to an aspect of the present invention, a magnetic disk control apparatus that controls read and write access to a disk drive, and restores a position where a correctable read error has occurred during read access, includes an error-area predicting unit that predicts, when a correctable read error occurs due to a cause, an area on the disk drive, in which an error can occur due to the cause, and specifies the area as predicted area, and a correcting unit that corrects the predicted area by rewriting the predicted area.

According to another aspect of the present invention, a magnetic disk apparatus that restores a position where a correctable read error has occurred during read access to a drive disk, includes an error-area predicting unit that predicts, when a correctable read error occurs due to a cause, an area on the disk drive, in which an error can occur due to the cause, and specifies the area as predicted area, and a correcting unit that corrects the predicted area by rewriting the predicted area.

According to still another aspect of the present invention, a method of correcting read error for restoring a position where a correctable read error has occurred during read access to a drive disk, includes predicting, when a correctable read error occurs due to a cause, an area on the disk drive, in which an error can occur due to the cause, specifying the area as predicted area, and correcting the predicted area by rewriting the predicted area.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 1A to 1D are schematics for explaining a method of correcting read error according to an embodiment of the present invention;

DETAILED DESCRIPTION OF THE PREFERRED EMBODIMENTS

Exemplary embodiments of the present invention are explained in detail below with reference to the accompanying drawings.

An outline of a conventional method of correcting read error is explained first referring to FIGS. 10A to 10D.

Figure 10A:
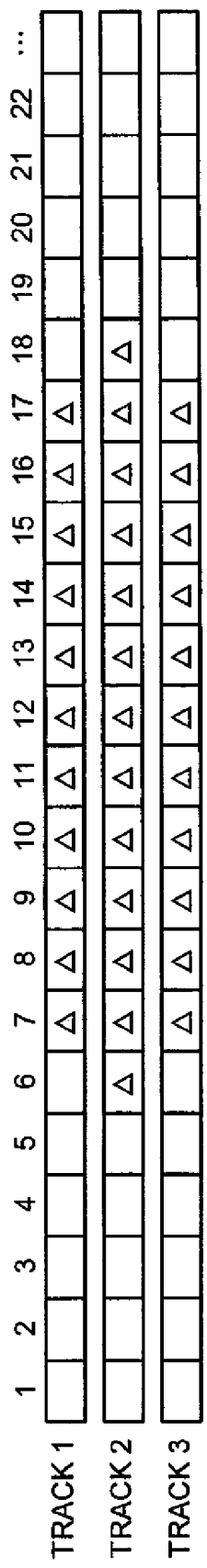
FIGS. 10A to 10D are schematics for explaining a conventional method of correcting read error.

FIG. 10A is a schematic for explaining the case where read errors occur in a wide range around sectors 7 to 17 of tracks 1 to 3. There are several possible causes of read errors that occur in a wide range, and they are generally related to improvement in the storage density of a magnetic disk apparatus. Examples of such causes include side erase, peak distortion, coercivity (Hc) variation, and minor defect.

The side erase is caused by the magnetic flux leakage of a magnetic head at the time of writing data to a certain sector, which affects sectors of adjacent tracks, and data cannot be read correctly. In one write operation, the influence of the magnetic flux leakage on other tracks is small. However, when such leakage is accumulated, a read error occurs in several tracks. The side erase phenomenon is increasingly significant because the space between tracks has been reduced to increase the storage density of the magnetic disk apparatus.

The peak distortion indicates a write error caused by a magnetic head departing from a platter (a disk coated with a magnetic material). The magnetic head writes data to the platter while floating at a very small distance above the spinning platter. To write data to the platter in high density and increase the storage density, the magnetic head needs to be as close to the platter as possible. However, the magnetic head sometimes departs from the platter by a predetermined distance or more for some reason. When the distance between the magnetic head and the platter increases, high-frequency data cannot be written completely, resulting in a write error.

The Hc variation is caused by a defective process of applying a magnetic material onto a platter material, which produces a part with low coercivity on the platter. The influence of the Hc variation increases relative to the increase in the storage density of the magnetic disk apparatus.

The minor defect refers to a minor scratch or the like on the surface of the platter. Even a minor defect that conventionally affects only a single sector affects a plurality of sectors in recent years due to the increase in the storage density of the magnetic disk.

Figure 10B:
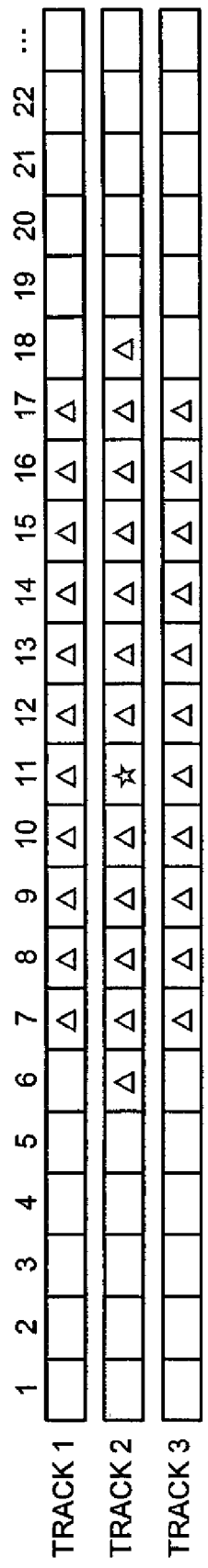

FIG. 10B is a schematic for explaining the case where the read errors include a correctable read error in one of the sectors (the sector 11 of the track 2). The correctable read error refers to a light error that while correct data cannot be read from the sector by normal read operation, the data can be obtained by error correction using a correction code or retry of the read operation. When left uncorrected, a correctable read error may be upgraded to a fatal one.

Figure 10C:
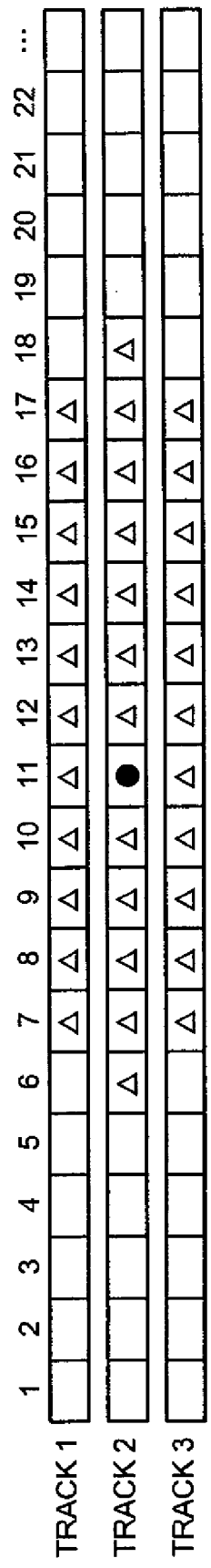

FIG. 10C is a schematic for explaining correction of the correctable read error by the conventional method. According to the conventional method, rewriting is performed in the sector (the sector 11 of the track 2) where a correctable read error has occurred, and thereby only the sector is corrected.

Figure 10D:
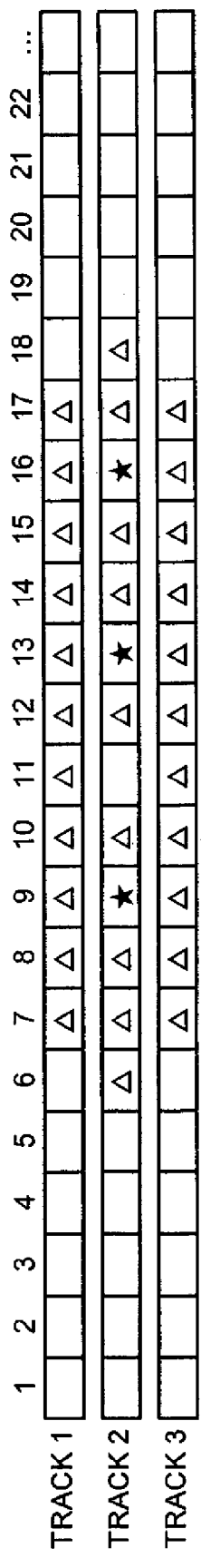

FIG. 10D is a schematic for explaining a state after the correctable read error is corrected by the conventional method. In FIG. 10D, the sector (the sector 11 of the track 2) where the correctable read error has occurred is recovered to the normal state. However, errors are upgraded in the surrounding sectors, and a fatal read error resulting in data loss occurs in a plurality of sectors (the sectors 9, 13, and 16 of the track 2).

Next, an outline of a method of correcting read error according to an embodiment of the present embodiment is explained referring to FIGS. 1A to 1D.

FIG. 1A is a schematic for explaining a case where read errors occur in a wide range around sectors 7 to 17 of tracks 1 to 3, as in FIG. 10A. FIG. 1B is a schematic for explaining a case where the read errors include a correctable read error in one of the sectors (the sector 11 of the track 2), as in FIG. 10B.

Figure 1C:
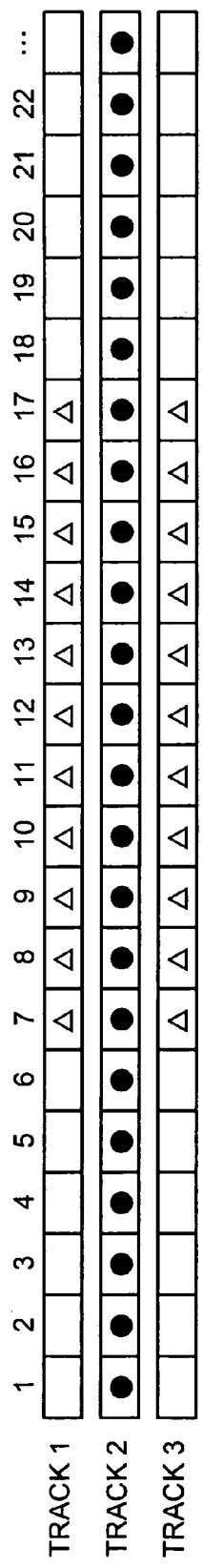

FIG. 1C is a schematic for explaining correction of the correctable read error by the method according to the embodiment. In this method, rewriting is performed not only in the sector where the correctable read error has occurred but also in a plurality of sectors around the sector depending on the error status. In the example of FIG. 1C, rewriting is performed in the entire track including the sector where the correctable read error has occurred.

Figure 1D:
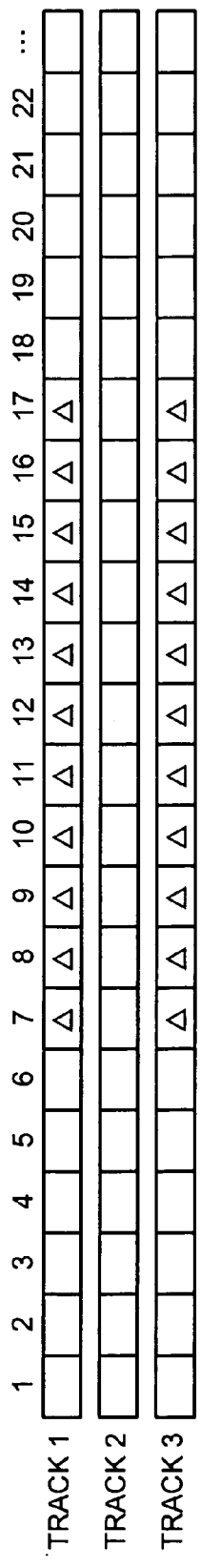

FIG. 1D depicts a state after the correctable read error is corrected by the method according to the embodiment. In FIG. 1D, the entire track including the sector (the sector 11 of the track 2) where the correctable read error has occurred is recovered to the normal state. This prevents the occurrence of a fatal read error in the sectors surrounding the sector where the correctable read error has occurred.

As described above, according to the embodiment, when a correctable read error has occurred in a sector, data is rewritten not only to the sector but also to surrounding sectors depending on the error status. Thus, a fatal read error can be prevented in sectors with the risk of occurrence of such an error, which prevents data loss.

When an error cannot be corrected by rewriting, data in the sector where the error has occurred is transferred to another sector, and the use of the erroneous sector is prohibited (this process is hereinafter referred to as "replacement"). Thus, data loss can be prevented.

Figure 2:
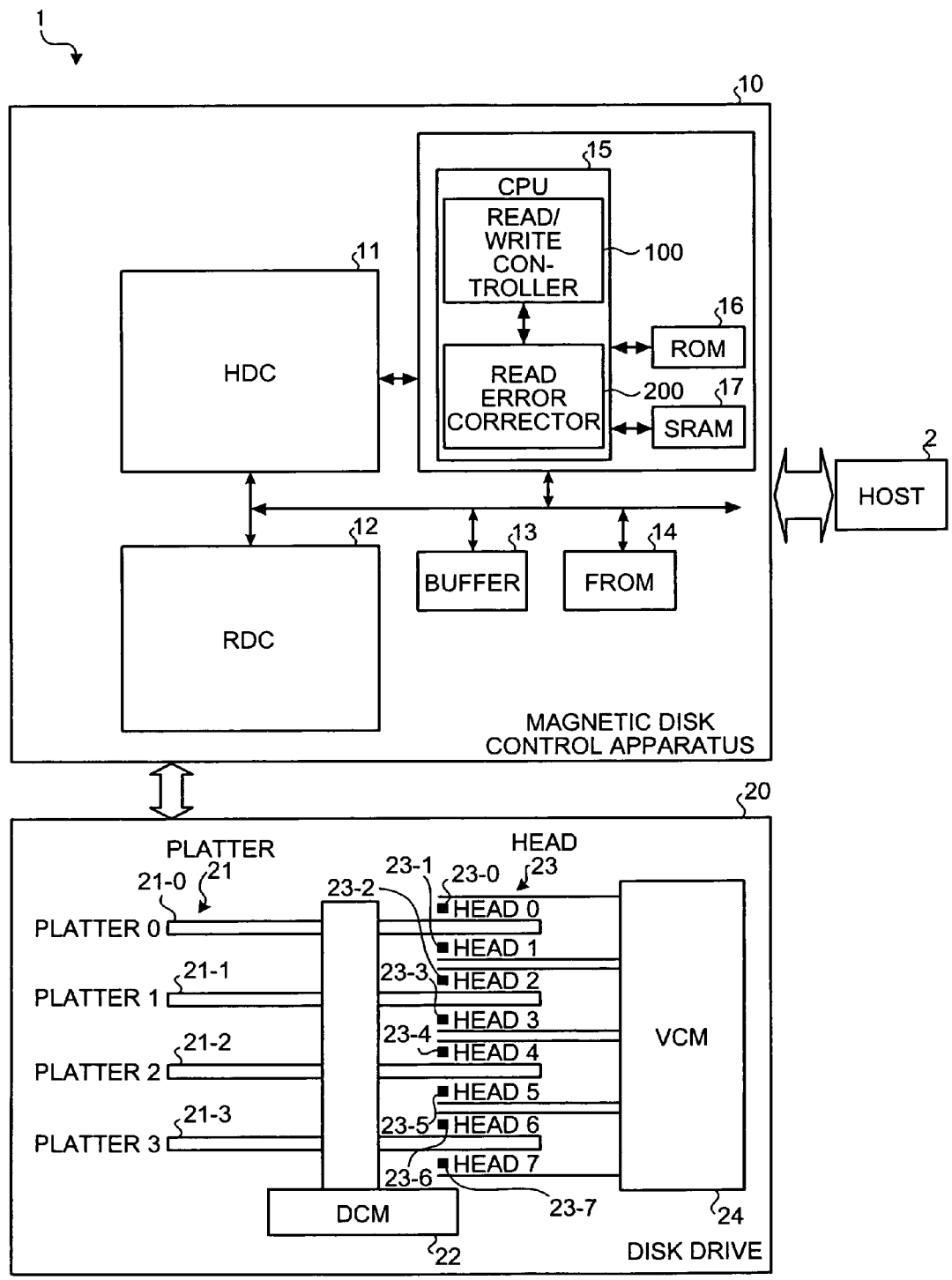
FIG. 2 is a block diagram of a magnetic disk apparatus according to the embodiment.

FIG. 2 is a block diagram of a magnetic disk apparatus 1 according to the embodiment.

The magnetic disk apparatus 1 includes a magnetic disk control apparatus 10, and a disk drive 20. The magnetic disk apparatus 1 is connected to a host device 2 through an interface such as Small Computer System Interface (SCSI), Serial Attached SCSI (SAS), Fibre Channel (FC), and AT Attachment (ATA). The magnetic disk apparatus 1 exchanges data and control commands with the host device 2.

The magnetic disk control apparatus 10 is a printed circuit board on which are mounted various large scale integrated circuits (LSIs) that control the magnetic disk apparatus 1. The magnetic disk control apparatus 10 includes a hard disk controller (HDC) 11, a read channel (RDC) 12, a buffer 13, a flash read only memory (FROM) 14, a central processing unit (CPU) 15, a read only memory (ROM) 16, and a static random access memory (SRAM) 17. These are connected to each other with a bus.

The HDC 11 is a controller that controls such operations as writing data stored in the buffer 13 to the disk drive 20, and reading data from the disk drive 20 to store the data in the buffer 13. The RDC 12 is an LSI that is present between the buffer 13 and the disk drive 20, and modulates and demodulates data.

The buffer 13 is a cache that temporarily stores data read or written between the host device 2 and the disk drive 20. The FROM 14 is a nonvolatile memory that stores firmware (program) which controls the operation of the magnetic disk apparatus 1.

The CPU 15 loads firmware into the SRAM 17 and executes the firmware. The CPU 15 executes part of the firmware therein to implement a read/write controller 100 and a read error corrector 200. The read/write controller 100 instructs the HDC 11 to read and write data according to an instruction from the host device 2, and controls data read and write. The read error corrector 200 corrects a read error by the above method according to the embodiment.

The ROM 16 is a nonvolatile memory that stores therein various types of parameters necessary to operate the magnetic disk apparatus 1. The SRAM 17 is a volatile memory into which the firmware is loaded from the FROM 14. The SRAM 17 stores therein a write count table 301, and an error history table 302 to record a history of errors that have occurred in the magnetic disk apparatus 1.

The disk drive 20 records data in the magnetic disk apparatus 1, and includes four platters 21 (21-0 to 21-3), a direct current motor (DCM) 22, eight heads 23 (23-0 to 23-7), and a voice coil motor (VCM) 24.

Each platter 21 is a hollow disk having magnetic recording surfaces on both the front and back sides. The DCM 22 rotates the platters 21 stacked one on top of the other. The head 23 magnetically reads and writes data to and from the magnetic recording surface of the platter 21. The VCM 24 moves the head 23 in a radial direction of the disk to a position to read or write desired data.

Figure 3:
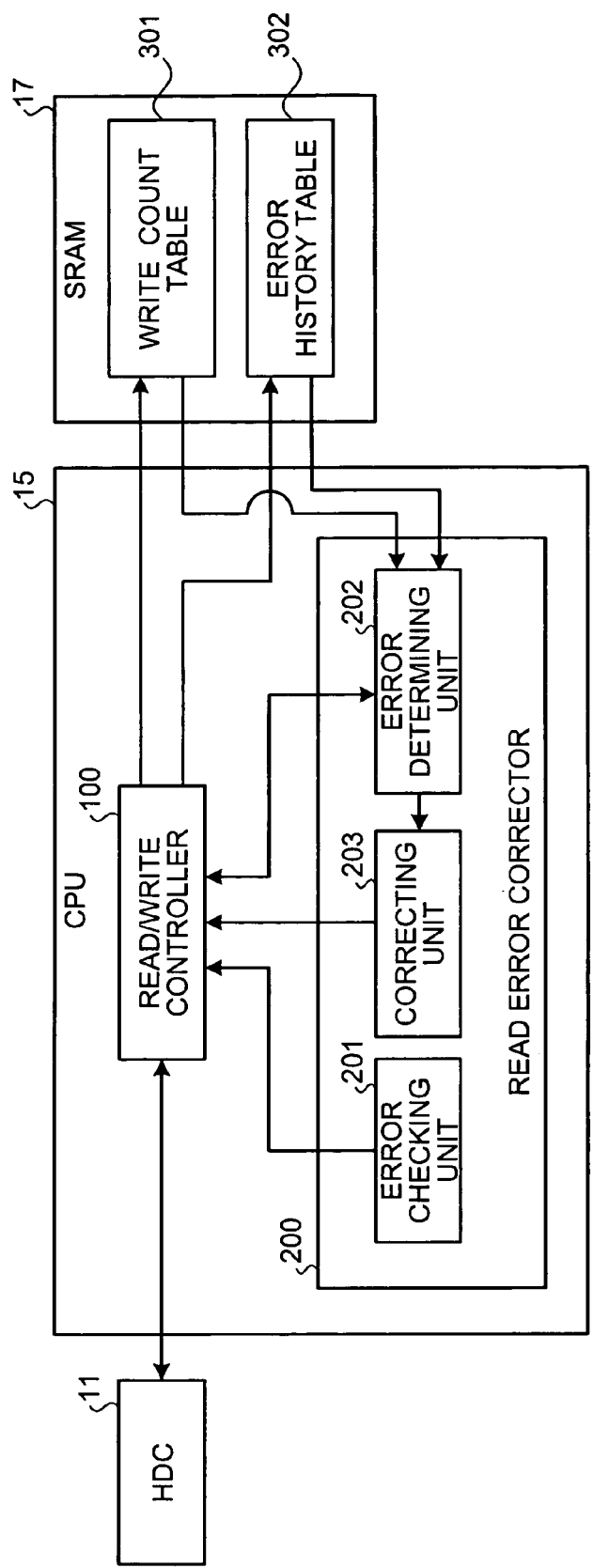
FIG. 3 is a functional block diagram of a read error corrector shown in FIG. 2.

FIG. 3 is a functional block diagram of the read error corrector 200. The read error corrector 200 includes an error checking unit 201, an error determining unit 202, and a correcting unit 203.

The error checking unit 201 periodically causes the read/write controller 100 to read each sector to detect a sector from which it is becoming difficult to correctly read data.

If a correctable read error occurs when performing read operation in response to a request from the host device 2 or the error checking unit 201, the read/write controller 100 stores a record of the error in the error history table 302 as well as informing the error determining unit 202 of the error.

Figures 4, 5:
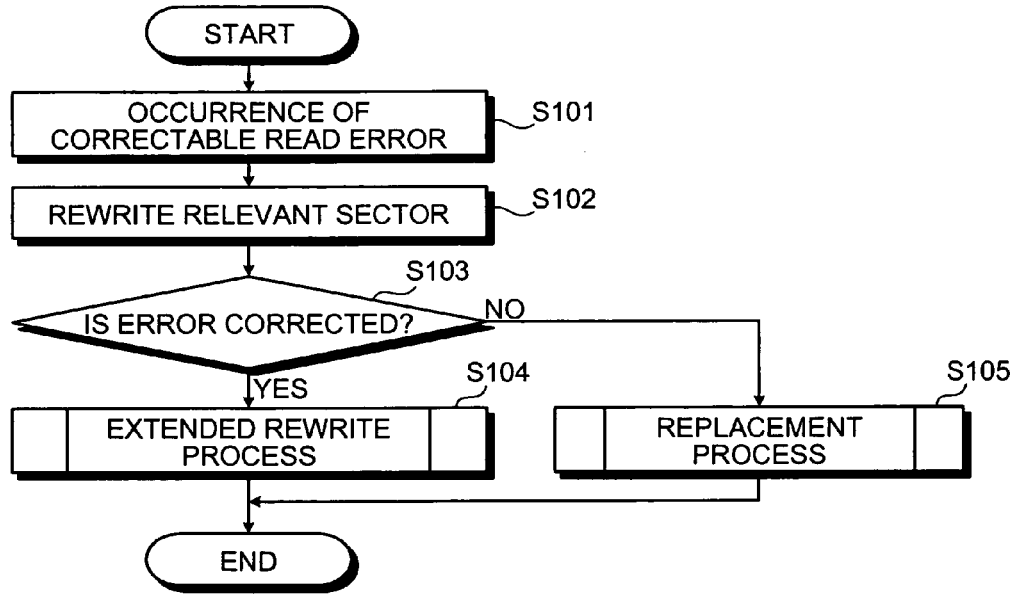
FIG. 4 is one example of contents of an error history table shown in FIG. 3.
FIG. 5 is a flowchart of the operation of the read error corrector.

FIG. 4 is one example of contents of the error history table 302. The error history table 302 contains information on correctable read error each time such an error occurs. Specifically, the error history table 302 stores information for identifying a position where the error has occurred such as a platter number, a track number and a sector number, error type indicating the type of the error, and date and time of the occurrence of the error.

The error history table 302 also stores therein information on various types of errors such as a buoyancy change (output variation) indicating that the head departs from the platter by a predetermined distance or more at the time of writing data to the disk drive 20.

The write count table 301 stores therein the cumulative number of times write operation has been performed by the read/write controller 100 with respect to each zone. A group of tracks each having the same number of sectors is referred to as zone. In general, the number of sectors per track increases from the innermost zone to the outermost zone.

The error determining unit 202 determines a range in which a read error due to the same cause is latently progressed, and that makes the correcting unit 203 correct this range, when the error determining unit 202 receives a notification of the occurrence of a correctable read error from the read/write controller 100. To determine a range in which a read error due to the same cause is latently progressed, the error determining unit 202 refers to information that is recorded in the write count table 301 and the error history table 302.

The correcting unit 203 causes the read/write controller 100 to rewrite or replace each sector that is within a range indicated by the error determining unit 202.

FIG. 5 is a flowchart of the operation of the read error corrector 200. In the example of FIG. 5, a correctable read error occurs when the read/write controller 100 performs a read operation in response to a request from the host device 2 or the error checking unit 201.

When a correctable read error occurs (step S101), the error determining unit 202 instructs the read/write controller 100 to rewrite a sector in which the error has occurred (step S102).

The read/write controller 100 reads data again from the same sector. When the error has been corrected (Yes at step S103), the read/write controller 100 performs an extended rewrite process described later to correct surrounding sectors (step S104). On the other hand, when the error has not been corrected (No at step S103), it is risky to continue using the surrounding sectors. Therefore, the read/write controller 100 performs a replacement process described later (step S105).

Figure 6:
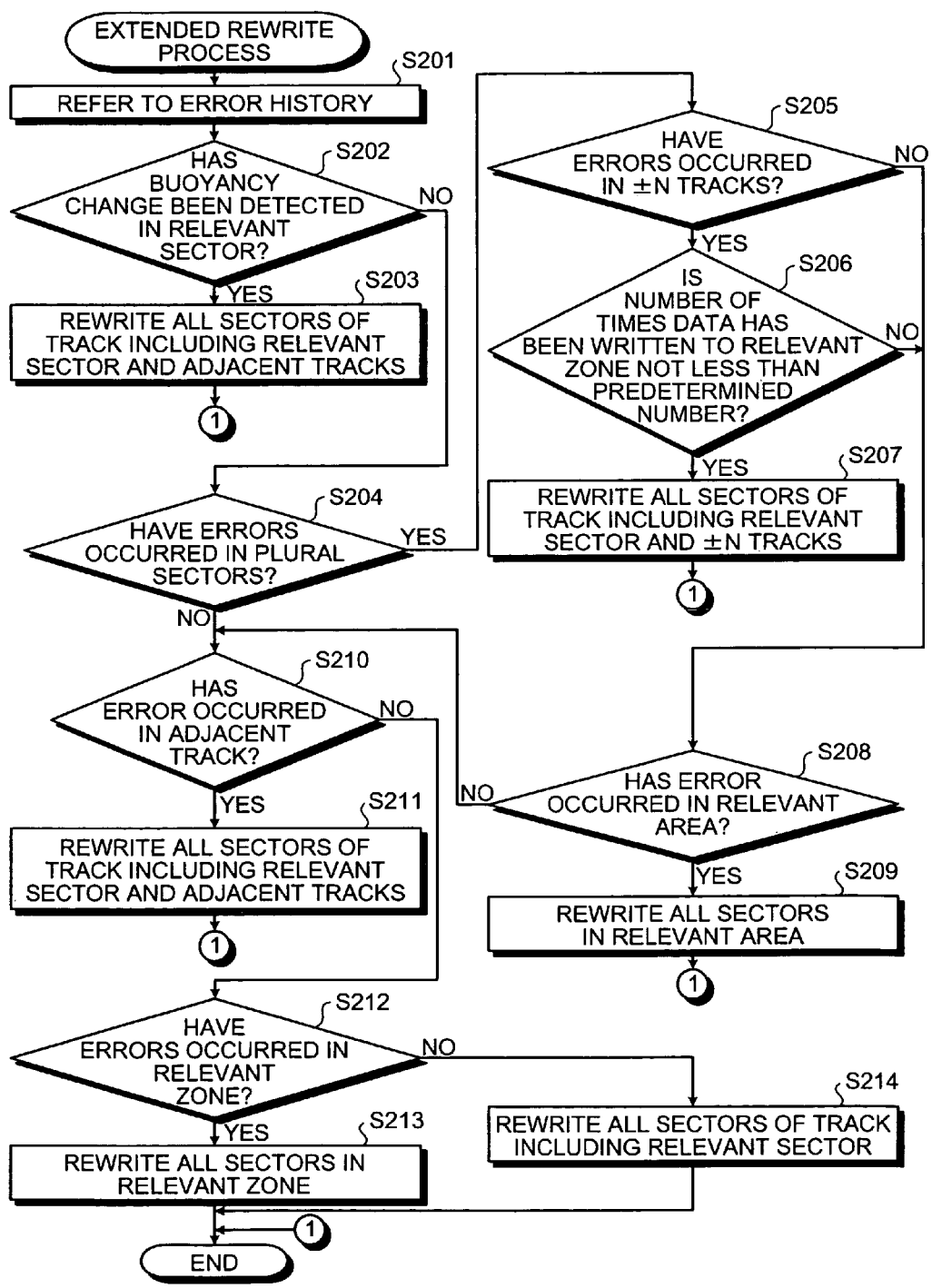
FIG. 6 is a detailed flowchart of an extended rewrite process shown in FIG. 5.

FIG. 6 is a detailed flowchart of the extended rewrite process. First, the error determining unit 202 refers to information in the error history table 302 (step S201). When there is a record that a buoyancy change has been detected in the sector where the correctable read error has occurred (Yes at step S202), the error determining unit 202 determines that peak distortion is a cause of the error. Then, the correcting unit 203 rewrites a range having a potential error, and ends the process. In this case, the range with a potential error includes a track that contains the sector where the correctable read error has occurred, and tracks adjacent thereto (step S203).

Assume that correctable read errors occur in a plurality of sectors within a predetermined period (Yes at step S204). When some of these errors occur in ±N (N: a predetermined natural number) tracks based on the sectors where the correctable read errors have occurred (Yes at step S205), and also when the cumulative number of times data has been written to a zone including these sectors is equal to or larger than a predetermined number (Yes at step S206), the error determining unit 202 determines that side erase is a cause of the error. Then, the correcting unit 203 rewrites a range having a potential error, and ends the process. In this case, the range with a potential error includes a track that contains the sectors where the correctable read errors have occurred, and tracks within the range of ±N from this track (step S207). The cumulative number of times data has been written to the zone is obtained from the write count table 301.

When correctable read errors occur in a plurality of sectors within a predetermined period (Yes at step S204), and also some of these errors occur within an area on a recording surface of the platter divided in a radial direction based on the sectors where the correctable read errors have occurred (Yes at step S208), the error determining unit 202 determines that Hc variation is a cause of the error. Then, the correcting unit 203 rewrites a range having a potential error, and ends the process. In this case, the range with a potential error corresponds to the area described above (step S209).

Figure 8:
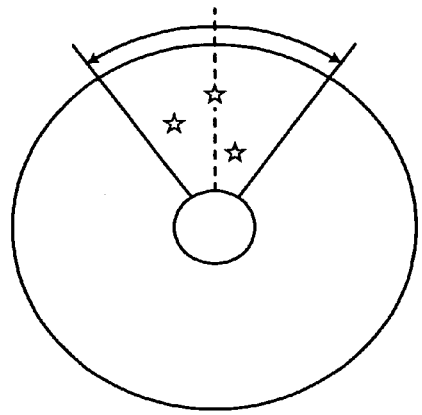
FIG. 8 is one example of an area on a platter shown in FIG. 2.

FIG. 8 is one example of an area on the recording surface of the platter. As shown in FIG. 8, the recording surface of the platter is divided in a radial direction into a fan-shaped area based on the sectors where the correctable read errors have occurred. This area is checked to detect a position where another error may occur, and is subjected to be corrected.

When a read error occurred at any time in the past in a track adjacent to the sector where a correctable read error has occurred (Yes at step S210), the error determining unit 202 determines that there are potential errors in a wide range including the adjacent track due to some cause. Then, the correcting unit 203 rewrites the track that includes the sector where the correctable read error has occurred and tracks adjacent to this track, and ends the process (step S211).

When a plurality of read errors occurred at any time in the past in a zone including the sector in which a correctable read error has occurred (Yes at step S212), the error determining unit 202 determines that there are potential errors in a wide range of this zone due to some cause. Then, the correcting unit 203 rewrites the entire zone, and ends the process (step S213).

In other cases than the above (No at step S212), there is a possibility that errors may occur in a wide range due to some cause. Therefore, the correcting unit 203 rewrites the entire track that includes the sector in which the correctable read error has occurred, and ends the process (step S214).

Figure 7:
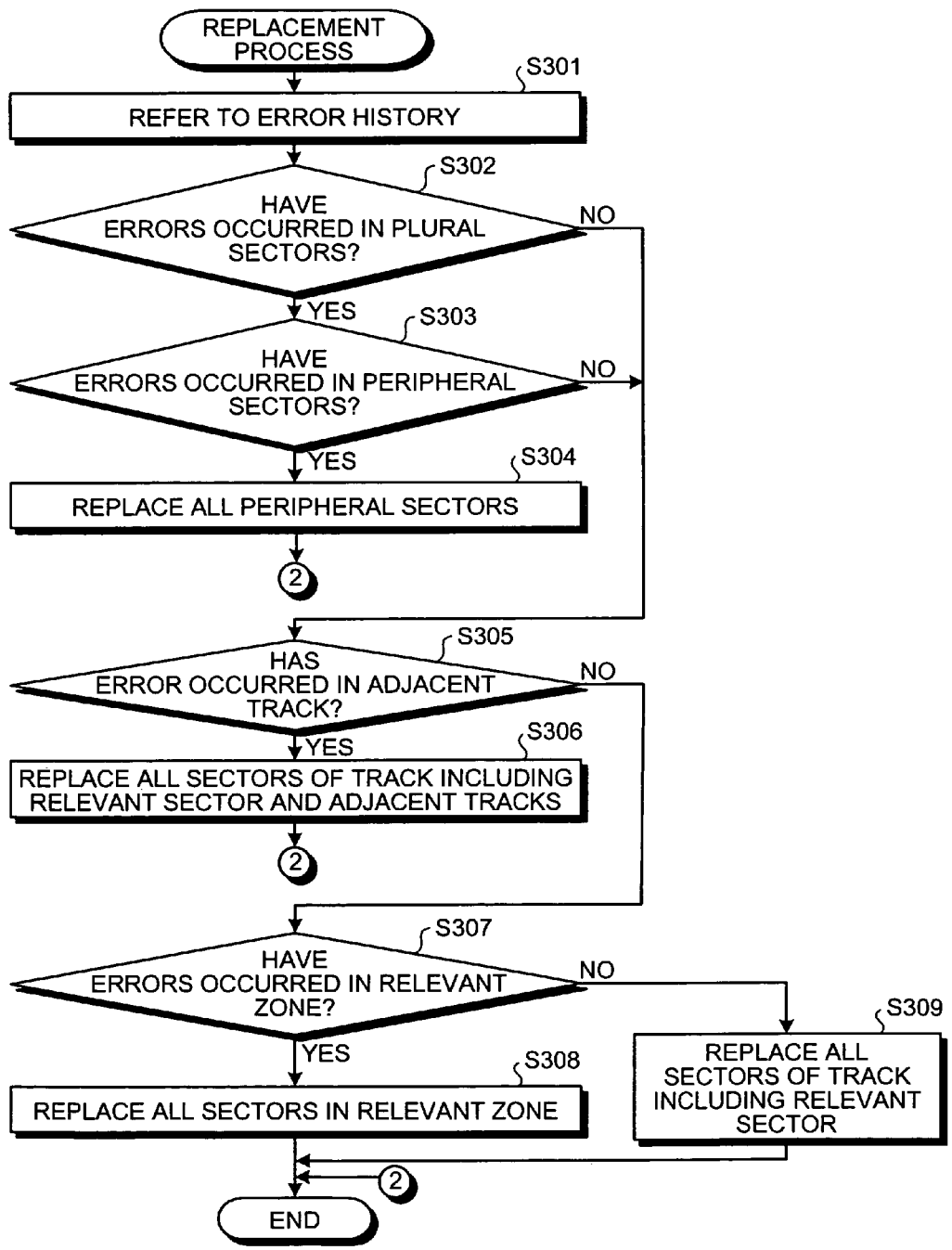
FIG. 7 is a detailed flowchart of a replacement process shown in FIG. 5.
Figure 9:
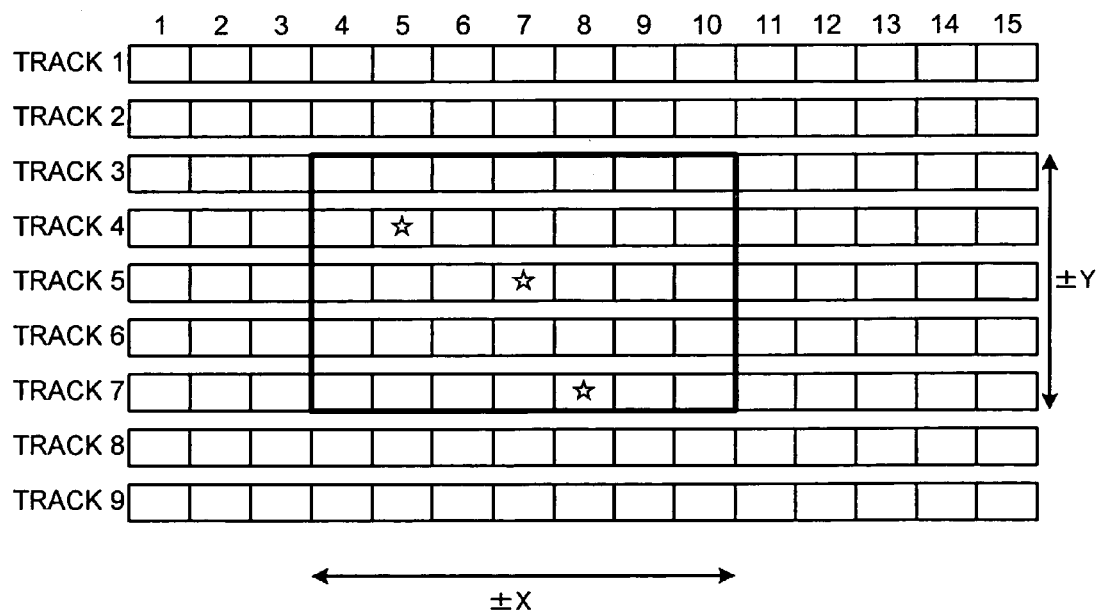
FIG. 9 is a schematic for explaining a case where a plurality of errors occurs in neighboring sectors.

FIG. 7 is a detailed flowchart of the replacement process. First, the error determining unit 202 refers to information in the error history table 302 (step S301). Assume that correctable read errors occur in a plurality of sectors within a predetermined period (Yes at step S302). When some of these errors occur within an area (area encircled by a thick line in FIG. 9) including ±X (X: a predetermined natural number) sectors and ±Y (Y: a predetermined natural number) tracks based on the sectors where the correctable read errors have occurred (Yes at step S303), the error determining unit 202 determines that a minor defect is a cause of the error. Then, the correcting unit 203 replaces the range having a potential error, and ends the process. In this case, the range with a potential error corresponds to the area described above (step S304).

When a read error occurs at any time in the past in a track adjacent to the sector where a correctable read error has occurred (Yes at step S305), the error determining unit 202 determines that there are potential errors in a wide range including the adjacent track due to some cause. Then, the correcting unit 203 replaces the track that includes the sector where the correctable read error has occurred and tracks adjacent thereto, and ends the process (step S306).

When a plurality of read errors occur at any time in the past in a zone including the sector where a correctable read error has occurred (Yes at step S307), the error determining unit 202 determines that there are potential errors in a wide range of this zone due to some cause. Then, the correcting unit 203 replaces the entire zone, and ends the process (step S308).

In other cases than the above (No at step S307), there is a possibility that errors may occur in a wide range due to some cause. Therefore, the correcting unit 203 replaces the entire track that includes the sector where the correctable read error has occurred, and ends the process (step S309).

The above process procedure is one example only; it is possible to change logic to determine a cause of an error and a size of an area having a potential error depending on characteristics of a disk drive that is mounted on the magnetic disk apparatus.

As described above, according to an embodiment of the present invention, when a correctable error occurs, an area in which there is a possibility that an error may occur due to the same cause is estimated, and the entire area is rewritten. Thus, it is possible to correct potential errors in a wide range including a sector where the correctable error has been detected, which prevents the error from resulting in a fatal error.

Moreover, when an error is detected in a sector that may be caused by peak distortion, all sectors of a track including the sector and adjacent tracks are corrected. When an error is detected that may be caused by side erase, all sectors of some tracks are corrected. When an error is detected in a sector that may be caused by Hc variation, the entire area including the sector is corrected. Therefore, the error can be prevented from resulting in a fatal error.

Furthermore, when an error cannot be prevented from becoming a fatal error by rewriting, a replacement process is performed instead of rewriting. Therefore, even such an error that is caused by a minor defect can be corrected.

As explained above, the present invention can be suitably applied to prevent data loss in a disk drive, and correct errors in a wide range including a sector where an error has been detected.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A magnetic disk control apparatus that controls read and write access to a disk drive, and restores a position where a correctable read error has occurred during read access, the magnetic disk control apparatus comprising:
   an error-area predicting unit that predicts, when a correctable read error occurs due to a cause, an area on the disk drive, in which an error can occur due to the cause, and specifies the area as predicted area; and
   a correcting unit that corrects the predicted area by rewriting the predicted area.

2. The magnetic disk control apparatus according to claim 1, wherein the error-area predicting unit specifies as the predicted area an entire track that includes a sector in which the correctable read error has occurred.

3. The magnetic disk control apparatus according to claim 1, further comprising a storage unit that stores therein information on an error that has occurred during read and write access to the disk drive, wherein
   when the information indicates that a read error has occurred in a second track adjacent to a first track including a sector in which the correctable read error has occurred, the error-area predicting unit specifies as the predicted area the entire first and second tracks.

4. The magnetic disk control apparatus according to claim 3, wherein when the information indicates that a read error has occurred in a zone that includes the sector, the error-area predicting unit specifies the entire zone as the predicted area.

5. The magnetic disk control apparatus according to claim 3, wherein when the information indicates that an error caused by a buoyancy change has occurred in the sector, the error-area predicting unit specifies as the predicted area the entire first and second tracks.

6. The magnetic disk control apparatus according to claim 1, further comprising a storage unit that stores therein information on number of times the disk drive is written with respect to each zone, wherein
   when a plurality of read errors occur in a range of $\pm N$ tracks, N being a natural number, from a sector in which the correctable read error has occurred, and the information indicates that number of times a zone including the sector is written exceeds a predetermined threshold, the error-area predicting unit specifies the range as the predicted area.

7. The magnetic disk control apparatus according to claim 1, wherein when a plurality of read errors occur in an area obtained by dividing a recording surface of the disk drive in a radial direction so that the area includes a sector in which the correctable read error has occurred, the error-area predicting unit specifies the area as the predicted area.

8. The magnetic disk control apparatus according to claim 1, wherein the correcting unit corrects the predicted area by replacing the predicted area.

9. The magnetic disk control apparatus according to claim 8, wherein when a plurality of read errors occur in a predetermined range around a sector in which the correctable error has occurred, the error-area predicting unit specifies the range as the predicted area.

10. A magnetic disk apparatus that restores a position where a correctable read error has occurred during read access to a drive disk, the magnetic disk apparatus comprising:
    an error-area predicting unit that predicts, when a correctable read error occurs due to a cause, an area on the disk drive, in which an error can occur due to the cause, and specifies the area as predicted area; and
    a correcting unit that corrects the predicted area by rewriting the predicted area.

11. The magnetic disk apparatus according to claim 10, wherein the error-area predicting unit specifies as the predicted area an entire track that includes a sector in which the correctable read error has occurred.

12. The magnetic disk apparatus according to claim 10, further comprising a storage unit that stores therein information on an error that has occurred during read and write access to the disk drive, wherein
    when the information indicates that a read error has occurred in a second track adjacent to a first track including a sector in which the correctable read error has occurred, the error-area predicting unit specifies as the predicted area the entire first and second tracks.

13. The magnetic disk apparatus according to claim 12, wherein when the information indicates that a read error has occurred in a zone that includes the sector, the error-area predicting unit specifies the entire zone as the predicted area.

14. The magnetic disk apparatus according to claim 12, wherein when the information indicates that an error caused by a buoyancy change has occurred in the sector, the error-area predicting unit specifies as the predicted area the entire first and second tracks.

15. The magnetic disk apparatus according to claim 10, further comprising a storage unit that stores therein information on number of times the disk drive is written with respect to each zone, wherein when a plurality of read errors occur in a range of ±N tracks, N being a natural number, from a sector in which the correctable read error has occurred, and the information indicates that number of times a zone including the sector is written exceeds a predetermined threshold, the error-area predicting unit specifies the range as the predicted area.

16. The magnetic disk apparatus according to claim 10, wherein when a plurality of read errors occur in an area obtained by dividing a recording surface of the disk drive in a radial direction so that the area includes a sector in which the correctable read error has occurred, the error-area predicting unit specifies the area as the predicted area.

17. The magnetic disk apparatus according to claim 10, wherein the correcting unit corrects the predicted area by replacing the predicted area.

18. The magnetic disk apparatus according to claim 17, wherein when a plurality of read errors occur in a predetermined range around a sector in which the correctable error has occurred, the error-area predicting unit specifies the range as the predicted area.

19. A method of correcting read error for restoring a position where a correctable read error has occurred during read access to a drive disk, the method comprising:

predicting, when a correctable read error occurs due to a cause, an area on the disk drive, in which an error can occur due to the cause;

specifying the area as predicted area; and correcting the predicted area by rewriting the predicted area.

* * * * *